United States Patent
Laitinen

(10) Patent No.: US 7,694,977 B2
(45) Date of Patent: Apr. 13, 2010

(54) ARRANGEMENT IN A MECHANICAL SHAFT SEAL

(75) Inventor: Kari Laitinen, Jyvaskyla (FI)

(73) Assignee: John Crane Safematic Oy, Muurame (FI)

( * ) Notice: Subject to any disclaimer, the term of this patent is extended or adjusted under 35 U.S.C. 154(b) by 45 days.

(21) Appl. No.: 10/588,856

(22) PCT Filed: Feb. 8, 2005

(86) PCT No.: PCT/FI2005/050019

§ 371 (c)(1),
(2), (4) Date: Aug. 9, 2006

(87) PCT Pub. No.: WO2005/075861

PCT Pub. Date: Aug. 18, 2005

(65) Prior Publication Data

US 2007/0170655 A1 Jul. 26, 2007

(30) Foreign Application Priority Data

Feb. 10, 2004 (FI) .................................. 20045031

(51) Int. Cl.
*F16J 15/34* (2006.01)
(52) U.S. Cl. ...................................... 277/371; 277/390
(58) Field of Classification Search ................. 277/359, 277/370–371, 390
See application file for complete search history.

(56) References Cited

U.S. PATENT DOCUMENTS

| | | | |
|---|---|---|---|
| 3,131,941 A * | 5/1964 | Donley | 277/363 |
| 4,773,680 A | 9/1988 | Krumme | |
| 5,171,024 A * | 12/1992 | Janocko | 277/644 |
| 6,357,753 B1 * | 3/2002 | Yamasaki et al. | 277/372 |

FOREIGN PATENT DOCUMENTS

| | | |
|---|---|---|
| DE | 90 16 123.8 U1 | 7/1991 |
| FR | 2 656 667 | 7/1991 |
| JP | 62-261764 | 11/1987 |
| SU | 1404725 A1 | 6/1988 |
| WO | WO 00/26501 | 5/2000 |

OTHER PUBLICATIONS

Geroge B. Kauffman, The Story of Nitinol: The Serendipitous Discovery of The Memory Metal and Its Application, 1996, The Chemical Educator, vol. 2, All Pages.*

* cited by examiner

*Primary Examiner*—Vishal Patel
(74) *Attorney, Agent, or Firm*—Barnes & Thornburg LLP

(57) ABSTRACT

The invention relates to an arrangement in a mechanical shaft seal. The arrangement comprises at least one sealing part rotating with a shaft in relation to a frame of the device and at least one sealing part fastened to the frame and/or to a separate frame part that is non-rotatable in relation thereto. The arrangement also comprises at least one additional part arranged to connect the frame and the sealing part that is non-rotatable in relation thereto and to prevent the rotation of the sealing part in relation to the frame. At least one set of the additional parts is memory metal elements.

9 Claims, 1 Drawing Sheet

ARRANGEMENT IN A MECHANICAL SHAFT SEAL

This is the U.S. National Stage of International Patent Application No. PCT/F12005/050019, filed on Feb. 8, 2005, which relies for priority upon Finnish Patent Application No. 20045031, filed on Feb. 10, 2004, the contents of both of which are hereby incorporated herein by reference in their entireties.

BACKGROUND OF THE INVENTION

The invention relates to an arrangement in a mechanical shaft seal and more particularly to an arrangement in a mechanical shaft seal comprising at least one sliding surface part rotating with a shaft in relation to a frame of the device, at least one sliding surface part fastened to the frame and/or to a separate frame part that is non-rotatable in relation thereto, the sliding surface part rotating in relation to the frame and the non-rotating sliding surface part are provided with sliding surfaces pressed against one another, at least one additional part arranged to connect the sliding surface part rotating in relation to the frame to the shaft and/or to at least one insertion part fastened to the shaft and rotating therewith in order to transfer the rotating motion from the shaft to the sliding surface part, and at least one additional part arranged to connect the sliding surface part, which is non-rotatable in relation to the frame, to the frame or at least to one insertion part connected to the frame in order to prevent the rotation of the sliding surface part in relation to the frame.

Known mechanical shaft seals typically comprise at least one rotating sliding surface part, which is fastened to a shaft rotating in relation to the frame of the device and at least one non-rotatable sliding surface part fastened to the frame of the device or to a separate frame part. These shaft seals also comprise separate additional parts preventing or shifting the rotation in relation to the frame, at least one spring ensuring the contact of the sliding surfaces to one another during operation, at least one insertion part that allows directing the spring forces to other parts. In addition, the shaft seal may comprise different auxiliary seals, which are used to seal the gaps between the parts mentioned above.

During operation the sliding surfaces of the sliding surface parts in the mechanical shaft seal pressed against each other rotate against one another, while one sliding surface part rotates with the shaft of the device and while the other sliding surface part remains non-rotatably fastened to the device or to the separate frame part. The purpose of these sliding surfaces is a gap formed between the shaft rotating in relation to the frame of the device and the frame. When operating, frictional force is exerted between the plane surfaces of the parts in the mechanical shaft seal rotating against one another, the frictional force being caused when the parts come into contact with one another. Depending on the prevailing conditions a medium inside the device or a medium to be conducted inside the mechanical shaft seal especially intended for this purpose cools and lubricates the plane surfaces of the sliding surface parts in the mechanical shaft seal. The purpose of the medium is to penetrate between the rotating plane surfaces and to reduce the frictional force exerted between the plane surfaces and thus to reduce the creation of thermal energy caused by the frictional force on the plane surfaces of the sliding surface parts in the mechanical shaft seal.

The rotating sliding surface part of such a mechanical shaft seal is connected to the shaft of the device by means of the additional parts included in the shaft seal and designed for this purpose or by means of machining features forwarding the torque caused by the rotation of the shaft to the rotating sliding surface part of the mechanical shaft seal, thus achieving the rotation of this part with the shaft. Correspondingly the non-rotating additional parts are connected to the device or to a separate frame part by means of the parts included in the mechanical shaft seal and designed for this purpose or by means of machining features preventing the non-rotating sliding surface from rotating in relation to the frame or to a separate frame part by impact of torque conveyed through the frictional force directed thereto by the sliding surface part rotating with the shaft.

The problem with the above arrangement is that the additional parts transferring torque from the shaft of the device included in the shaft seal or the machining features are subjected to wear or are broken at the points, from which torque is transferred from one part to another, for instance to the sliding surface parts. The same problem is known as regards the parts intended to be non-rotating at points, from which the non-rotating parts are locked to the device or to a separate frame part. The torque caused by frictional force formed between the plane surfaces of the non-rotating parts and the rotating parts in the mechanical shaft seal wears and breaks the additional parts or the machining features, by means of which the rotating motion of the shaft of the device is transferred to the rotating parts of the mechanical seal, or which tend to be used for preventing the rotating motion produced by the torque caused by the frictional force in the non-rotating parts of the mechanical shaft seal. This phenomenon causes the mechanical shaft seal to be prematurely damaged in such a manner that the mechanical seal no longer operates as planned for sealing the gap between the rotating shaft and the static parts of the device. In addition, the torque causes the sliding surfaces of the sliding surface parts in the mechanical seal to deform so that the mechanical seal no longer operates as planned.

BRIEF DESCRIPTION OF THE INVENTION

It is the object of the invention to provide an arrangement in a mechanical seal shaft to solve the above problems. The object of the invention is achieved with the arrangement characterized in that one or more of the additional parts are memory metal elements arranged to bend within the limits of the reversible deformation of the material.

The preferred embodiments of the invention are disclosed in the dependent claims.

The idea of the invention is that the additional parts transferring the torque of the rotating parts in the mechanical shaft seal or the machining features and the additional parts preventing the rotation of the non-rotating parts or the machining features are implemented by forming said parts of memory metal elements, which are arranged to bend within the limits of the reversible deformation of the material. Such memory metals are known from the property known as the super elasticity of the material, which is perceived as being provided with a multifoldly larger reversible deformation compared with other common metals when the metal is placed under the influence of torque.

The method and system of the invention provide such an advantage that the implementation of transferring the torque of the rotating parts in the mechanical shaft seal and preventing the rotation of the non-rotating parts using memory metal elements as the additional parts transferring torque or receiving torque or as the machining features reduces wear and breakage as well as deformation of the sliding surfaces of the sliding surface parts. In addition, the solution of the invention can be utilized in already available shaft seals and new shaft seals.

BRIEF DESCRIPTION OF THE DRAWINGS

In the following the invention will be explained by means of the preferred embodiments with reference to the accompanying drawings, in which.

DETAILED DESCRIPTION OF THE INVENTION

Figure 1:
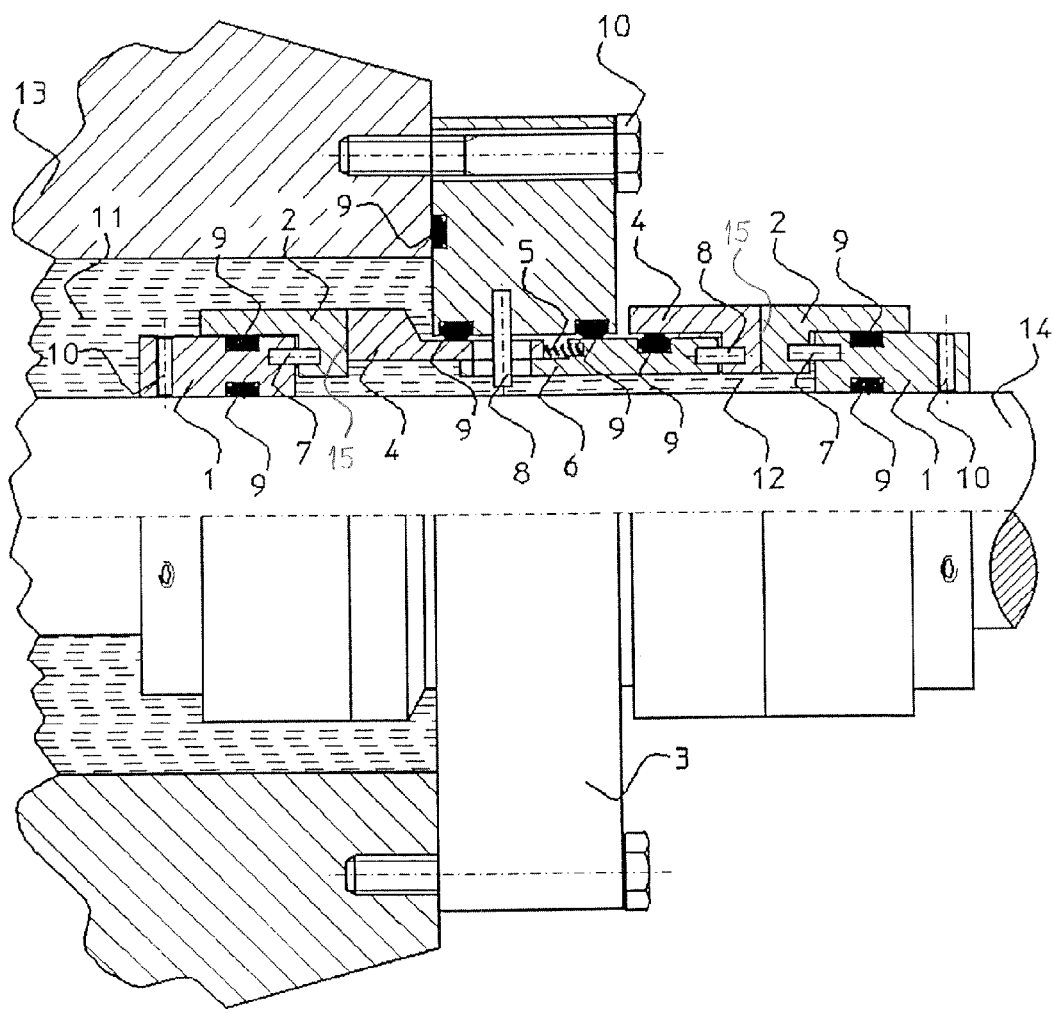
FIG. 1 shows the structure of a typical shaft seal utilizing parts transferring torque according to the present invention.

With reference to FIG. 1, a prior art mechanical shaft seal of a certain type is shown that has been improved with the solution according to the present invention. Such a shaft seal according to FIG. 1 is used to seal the gap between a shaft 14 entering a frame 13 or a frame part 3 and rotating in relation thereto and the frame 13 or frame part 3. Such a seal according to the present embodiment comprises an insertion ring 1 fastened to the shaft 14 that rotates with the shaft 14 and is fastened thereto with a screw 10 or with another similar fastening device. A sliding surface part 2 is fastened or connected to the insertion ring 1, and the sliding surface part 2 is provided with a sliding surface 15 placed substantially perpendicularly against the longitudinal direction of the shaft 14 that rotates with the shaft 14. The insertion ring 1 and the sliding surface part 2 are connected together with additional parts 7, which are draw pins 7 in this embodiment. The draw pins 7 convey the rotating motion of the shaft 14 from the insertion part 1 to the sliding surface part 2 and they are in accordance with the invention made of memory metal elements. According to FIG. 1, the number of entities formed of the above-described insertion part 1, sliding surface part 2 and draw pins 7 is two, whereof one is placed in the inner shaft space of the frame 13 of the device provided with a medium 11, and the other one is placed outside the frame 13.

Thus, the shaft 14 enters the frame 13 of the device through the opening placed therein, on which opening a frame part 3 is placed provided with a further opening for the shaft 14. Sliding surface parts 4 are fastened and connected to the frame part 3, the sliding surface parts being fastened to the frame part 3 so as not to rotate with the shaft, thus being nonrotating. The sliding surface parts 4 are also provided with sliding surfaces 15 which rest substantially perpendicularly against the longitudinal direction of the shaft 14. There are two sliding surface parts 14, whereof one is placed in the inner shaft space of the frame 13 of the device provided with a medium 11, and the other one is placed outside the frame 13. The sliding surface parts 2 and the sliding surface parts 4 are placed and arranged so that these sliding surface parts 2 and 4 form two separate pairs in the shaft space inside the frame 13 of the device and outside the device, whereby the corresponding sliding surfaces of the sliding surface parts 2 and 4 are placed against each other. Then, while the shaft 14 is rotating these sliding surfaces 15 of the sliding surface parts 2 rotate with the shaft 14 in relation to the sliding surfaces 15 of the non-rotating sliding surface parts 4 fixedly fastened to the frame 13.

The sliding surface parts 4 are pressed in accordance with FIG. 1 with a spring 5 against the sliding surface parts 2. The sliding surface part 4 projecting from the frame part 3 to the shaft space inside the frame 13 of the device is connected directly to the frame part 3 with a draw pin forming the memory metal element in accordance with the invention. The draw pin 8 that projects from the frame part 3 and connects the sliding surface part 4 in the shaft space inside the frame 13 to the frame part 3 prevents this sliding surface part 4 from rotating with the shaft 14.

The second sliding surface part 4 outside the frame 13 of the device is, in turn, connected through an insertion part 6 to the frame part 3. This sliding surface part 4 is connected with the draw pin 8 to the insertion part 6, which is further connected to the frame part 3 with the draw pin 8 projecting from the frame part 3. The insertion part 6 and the sliding surface part 4 placed in the shaft space inside the frame 13 is connected with the draw pin 8 projecting from the frame part 3 to the frame part 3 in such a manner that the parts are able to move in the direction of the shaft 14 to the frame 13 and frame part 3 of the device. The spring 5, in turn, is mounted in accordance with FIG. 1 between the insertion part 6 and the sliding surface part 4 placed in the shaft space inside the frame 13 so that the spring is pre-tensioned to push the insertion part 6 and the sliding surface part 4 in the direction of the shaft in opposite directions. Then the sliding surface 15 of the sliding surface part 4 non-rotatably connected to the frame placed in the shaft space inside the frame 13 is pressed against the sliding surface 15 of the sliding surface part 2 rotating with the shaft 14 placed in the shaft space. Correspondingly the insertion part 6 pushes by means of the draw pin 8 connecting the insertion part 6 and the sliding surface part 4 outside the frame 13 of the device the sliding surface 15 of the sliding surface part 4 outside the frame 13 against the sliding surface 15 of the sliding surface part 2 outside the frame 13. The spring 5, the number of which may vary from one to several, thus makes sure on account of the spring force thereof that the sliding surfaces 15 of the sliding surface parts 4 non-rotatable in relation to the frame 13 and the sliding surfaces 15 of the sliding surface parts 2 rotating with the shaft 14 are pressed against one another.

Furthermore, the mechanical shaft seal according to this embodiment comprises auxiliary seals 9 placed between the frame 13 of the device, frame part 3 and the different parts of the shaft seal. The auxiliary seals may be O-rings or other kinds of seals appropriate for the purpose, which are supposed to ensure the sealing of the shaft seal. In this embodiment the shaft space inside the frame 13 is sealed so that the medium 11 in the shaft space is unable to leak from the device. In addition to the medium 11 to be sealed a second medium 12 is utilized in the actual shaft sealing, the idea of which is for instance to lubricate the sliding surfaces 15 of the sliding surface parts 2 and 4 pressed against one another in order to reduce the friction between them. Such a lubricating medium 12 is placed in a space defined by the shaft 14 and the parts 1, 2, 4 of the shaft seal, whereby the medium does not come into direct contact with the medium 11 to be sealed in the shaft space.

During the rotation of the shaft 14 the sliding surface parts connected with the draw pins 7 to the insertion ring 1 fastened to the shaft 14 rotate with the shaft, whereas the sliding surface parts 4 connected with the draw pins 8 to the frame part 3 and the insertion part do not rotate in relation to the frame part 3. What is formed when the sliding surfaces 15 of the sliding parts 2 and 4 rotate against each other is friction directing torque to the rotating sliding surface parts 2 and to the non-rotating sliding surface parts 4, the draw pins 7 and 8 receive the torque and transfer it from one part of the shaft seal to another. These draw pins 7 and 8 are then placed under stress, thus being susceptible to breakage and subjected to wear while used so that as a consequence of their being damaged the mechanical shaft seal no longer operates as planned. The parts that these pins are in contact with wear and break in a similar manner. As regards the machining features, both features are subjected to wear. By making these draw pins 7 and 8 that receive said torque and transfer the shaft seal from one part to another of super elastic memory metal elements, which are capable of significantly larger reversible deformation than other metals, the draw pins receiving torque are not broken easily. In the shaft seal shown in FIG. 1 the insertion ring 1 can also be left out.

In the different applications of the shaft seal, these memory metal elements may also be plates, rings, threaded pins or machining features of the insertion ring 6 of the sliding surface parts 2, 4 and the insertion ring 1, or any other kind of elements appropriate for each application. The invention is not restricted to the shaft seal shown in FIG. 1 but can be utilized in all types of shaft seals. A general principle in all types of shaft seals is that the sliding surface parts 2 rotating with the shaft 14 of the seal are connected to the shaft 14 with memory metal elements and the sliding surface parts 4 non-rotatable in relation to the frame 13 of the device are connected to the frame 13 (to a separate frame part 3) using memory metal elements. The sliding surface parts 2, 4 do not have to be connected directly to the shaft 14 and the frame 13 but they may be connected by means of the insertion parts 1, 6, which insertion parts in turn are connected or fastened to the shaft 14 and the frame 13.

It is apparent for those skilled in the art that as technology progresses the basic idea of the invention can be implemented in various ways. The invention and the embodiments thereof are therefore not restricted to the above described examples but may vary within the scope of the claims.

The invention claimed is:

1. An arrangement in a mechanical shaft seal, comprising:
   a first sliding surface part rotating with a shaft in relation to a frame; and
   a second sliding surface part fastened to at least one of the frame or a separate frame part that is non-rotatable in relation thereto,
   wherein:
       the first sliding surface part and the second sliding surface part are provided with sliding surfaces pressed against one another,
       a first additional part is arranged to connect the first sliding surface part to at least one of the shaft and a first insertion part fastened to the shaft and is configured to rotate therewith in order to transfer the rotating motion from the shaft to the first sliding surface part,
       a second additional part is arranged to connect the second sliding surface part to the frame or at least to one second insertion part connected to the frame in order to prevent the rotation of the second sliding surface part in relation to the frame, and
       at least one of the first additional part arranged to transfer the rotation torque of at least one of the shaft and the second additional part receiving torque is a super elastic memory metal element arranged to bend within the limits of the reversible deformation of the material.

2. The arrangement of claim 1, wherein all the first and second additional parts are memory metal elements.

3. The arrangement of claim 1, wherein all the first and second additional parts are pins.

4. The arrangement of claim 1, wherein all the first and second additional parts are threaded pins.

5. The arrangement of claim 1, wherein all the first and second additional parts are plates.

6. The arrangement of claim 1, wherein all the first and second additional parts are rings.

7. The arrangement of claim 1, wherein the first and second additional parts are machining features of at least one of the first sliding surface part and the second sliding surface part.

8. The arrangement of claim 1, wherein the arrangement further comprises at least one spring, which is arranged to press opposite sliding surfaces of the first sliding surface part and the second sliding surface part against one another.

9. The arrangement of claim 8, wherein the second insertion part is movably fastened in the longitudinal direction of the shaft to the frame, which is connected to the second sliding surface part which is pressed using the spring against the second sliding surface part, the sliding surface of the spring being further pressed against the sliding surface of the first sliding surface part.

\* \* \* \* \*